US006908142B2

(12) United States Patent
Gougeon et al.

(10) Patent No.: US 6,908,142 B2
(45) Date of Patent: Jun. 21, 2005

(54) VEHICLE LIFTGATE WITH ACCESSORY COMPONENT MODULE

(75) Inventors: Philippe Gougeon, Bloomfield Hills, MI (US); William Ethan A. McClure, Clawson, MI (US); William C. Romesburg, Troy, MI (US); Leonida S. Vaitus, Windsor (CA)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 88 days.

(21) Appl. No.: 10/356,417

(22) Filed: Jan. 31, 2003

(65) Prior Publication Data

US 2004/0150250 A1 Aug. 5, 2004

(51) Int. Cl.$^7$ .................................. B60J 5/10; B60J 1/20
(52) U.S. Cl. ................................. 296/146.8; 296/146.1; 296/50
(58) Field of Search ...................... 296/146.8, 146.5, 296/146.9, 152, 50, 52, 96.17, 146.1; 49/502; 16/2.1

(56) References Cited

U.S. PATENT DOCUMENTS

| | | | | |
|---|---|---|---|---|
| 3,424,503 A | * | 1/1969 | Schulz ........................ 384/222 |
| 3,756,551 A | * | 9/1973 | Bishop ..................... 267/141.1 |
| 3,895,409 A | * | 7/1975 | Kwatonowski ................ 16/2.1 |
| 4,295,691 A | * | 10/1981 | Rubenthaler ................. 384/297 |
| 6,019,292 A | | 2/2000 | Walther |
| 6,019,418 A | * | 2/2000 | Emerling et al. ......... 296/146.8 |
| 6,027,075 A | | 2/2000 | Petrenko |
| 6,123,384 A | * | 9/2000 | Eustache et al. .......... 296/146.2 |
| 6,131,989 A | * | 10/2000 | Montone et al. .......... 296/146.8 |
| 6,174,016 B1 | * | 1/2001 | Ponziani ....................... 296/56 |
| 6,234,564 B1 | * | 5/2001 | Kim ......................... 296/146.8 |
| 6,416,106 B2 | * | 7/2002 | Ponziani ....................... 296/56 |
| 6,435,596 B1 | * | 8/2002 | Pyo ............................ 296/106 |
| 6,458,002 B1 | | 10/2002 | Buchanan, Jr. |
| 6,523,882 B2 | * | 2/2003 | Ishikawa et al. .......... 296/146.8 |

\* cited by examiner

*Primary Examiner*—D. Glenn Dayoan
*Assistant Examiner*—Greg Blankenship
(74) *Attorney, Agent, or Firm*—J. Gordon Lewis (57) ABSTRACT

A module includes a frame having opposed first and second ends. First and second mounts are associated with each of the first and second frame ends for mounting at least one of a plurality of components to the frame. In one aspect, the frame is formed of a flexible material allowing offset of the first and second ends relative to each other during mounting of the frame to a vehicle liftgate. In another aspect, the frame is formed as a rigid member. In one aspect, the mounts are separate mounting brackets or mounting flanges carried on the components, which are separably attachable to the frame. In the rigid frame aspect, the mounts are end portions of the frame.

15 Claims, 7 Drawing Sheets

VEHICLE LIFTGATE WITH ACCESSORY COMPONENT MODULE

BACKGROUND

The present invention relates, in general, to motor vehicle liftgates or rear hatches and, more specifically, to accessory components mounted on such vehicle liftgate or rear hatches.

In modern vehicles, larger vehicles such as SUVs, vans and station wagons have a liftgate or rear hatch which closes a rear opening in the vehicle body. The liftgate is pivotally attached, usually by hinges, to the vehicle body structure surrounding the rear opening. The liftgate is releasably latchable to the vehicle structure by a latch mechanism so as to be movable between a closed position latched to the vehicle body structure and a pivoted, open position allowing access to the interior of the vehicle through the rear opening.

The liftgate itself is formed of a panel structure, which is stamped or otherwise formed into a panel having an upper opening for receiving a glass window. An interior trim panel is attachable to the liftgate panel to cover components mounted on the gate.

The liftgate forms a platform for a number of different accessories or components, such as a flipglass latch, a wiper motor and associated wiper arm, license plate lights, and a wash pump and/or wash nozzle. Various lights as well as the center high mounted stop light may also be mounted on the liftgate along with the liftgate latch mechanism. Other components which are usually mounted on the liftgate can include electrical contact connections to the defrost grid mounted on the liftgate glass or fiberglass.

All of these accessories or components are manufactured separately from the liftgate panel structure and are mounted, usually one at a time, on the liftgate while the vehicle is being assembled. The mounting of each component on the liftgate panel either directly or through brackets typically requires mechanical fasteners and, usually, an electrical connection via a plug-in connector, screw terminal, etc. All of the mounting procedures, and the mechanical and electrical connections require time, multiple workers and an increased length on the vehicle assembly line. In addition, although each component can be tested at its manufacturing site, the numerous multiple mechanical and electrical connections all create additional sources of defects which may require additional checking after assembly on the liftgate.

As can be seen, all of these factors lead to a substantial assembly time for the liftgate thereby resulting in a higher than desirable cost. To address these problems, a modular approach has been proposed in which several components are separably manufactured, pretested, and assembled into a single module, with only the module having to be mounted in a single operation on a liftgate. The number of separate mechanical fasteners and electrical connections can also be reduced by this modular approach. However, the modular approach has been proposed only for a limited number of components. This has resulted in less than anticipated savings in assembly time and labor.

Thus, it would be desirable to provide an improved modular component apparatus for vehicle liftgates in which multiple components are mounted in a single module for a single installation on the liftgate thereby improving reliability and reducing assembly costs. It would also be desirable to provide a modular component apparatus for a vehicle liftgate which has pre-aligned connection points, combined mounting points, and reduced weight which provides an increased glass viewing area.

SUMMARY

The present invention is a module for remounting a plurality of accessory or components on a vehicle liftgate in a single assembly operation.

In one aspect, the module includes a frame, individual components mounted on the frame including at least of a wiper drive motor, a flip glass liftgate window latch and a liftgate latch, and means are carried on the frame for mounting the frame to the liftgate.

Certain of the components are mounted on a first end of the frame and certain other components are mounted on a second end of the frame.

In one aspect, the frame is formed with flexibility to enable the first and second ends of the frame to be offset relative to each other during the mounting the frame to a liftgate.

In another aspect, the frame is rigid.

The module of the present invention provides significant advantages over previous liftgate accessory or component mounting methods by incorporating a plurality of liftgate components into a unitary module which can be attached to the liftgate in single assembly operation. The use of a frame having components mounted at opposed ends enables widely spaced components to be mounted on a liftgate in a single assembly operation rather than requiring the components to be individually mounted on the liftgate.

The unitary module improves the reliability of the components since the components can be preassembled, pre-tested and even pre-wired on the module prior to mounted the module on the liftgate. The number of workers required to mount all of the components on the liftgate in the vehicle assembly plant is reduced along with the assembly line length and the overall assembly time. This reduces the overall cost of the liftgate components for more economical and efficient operations.

BRIEF DESCRIPTION OF THE DRAWING

The various features, advantages and other uses of the present invention will become more apparent by referring to the following detailed description and drawing in which.

DETAILED DESCRIPTION

Figure 1:
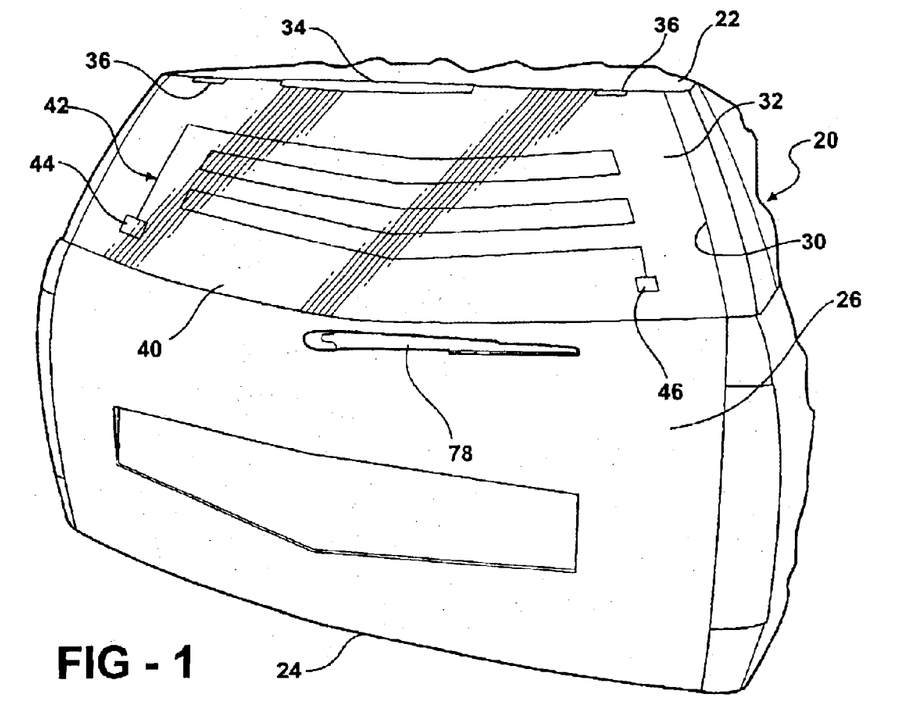
FIG. 1 is a front exterior elevational view of an exemplary vehicle lift gate utilizing the component module according to the present invention.

Referring now to the drawing, and to FIG. 1 in general, there is depicted a pictorial representation of a motor vehicle liftgate or rear hatch 20. The shape of the liftgate 20 will vary from vehicle to vehicle.

The liftgate 20 is intended, by example only, to be articulated or pivoted about an upper generally horizontally extending edge 22 by means of hinges attached to the surrounding vehicle body structure, not shown. When the liftgate 20 is pivotally mounted about the upper edge 22, the latch means will normally be associated with an opposed bottom edge 24. The liftgate 20 may also be articulated to the vehicle body about a vertical axis on one of the lateral side edges, with the opposite lateral edge carrying a locking means for securing the lift gate 20 in a fixed position closing the rear opening in the vehicle.

Figure 7:
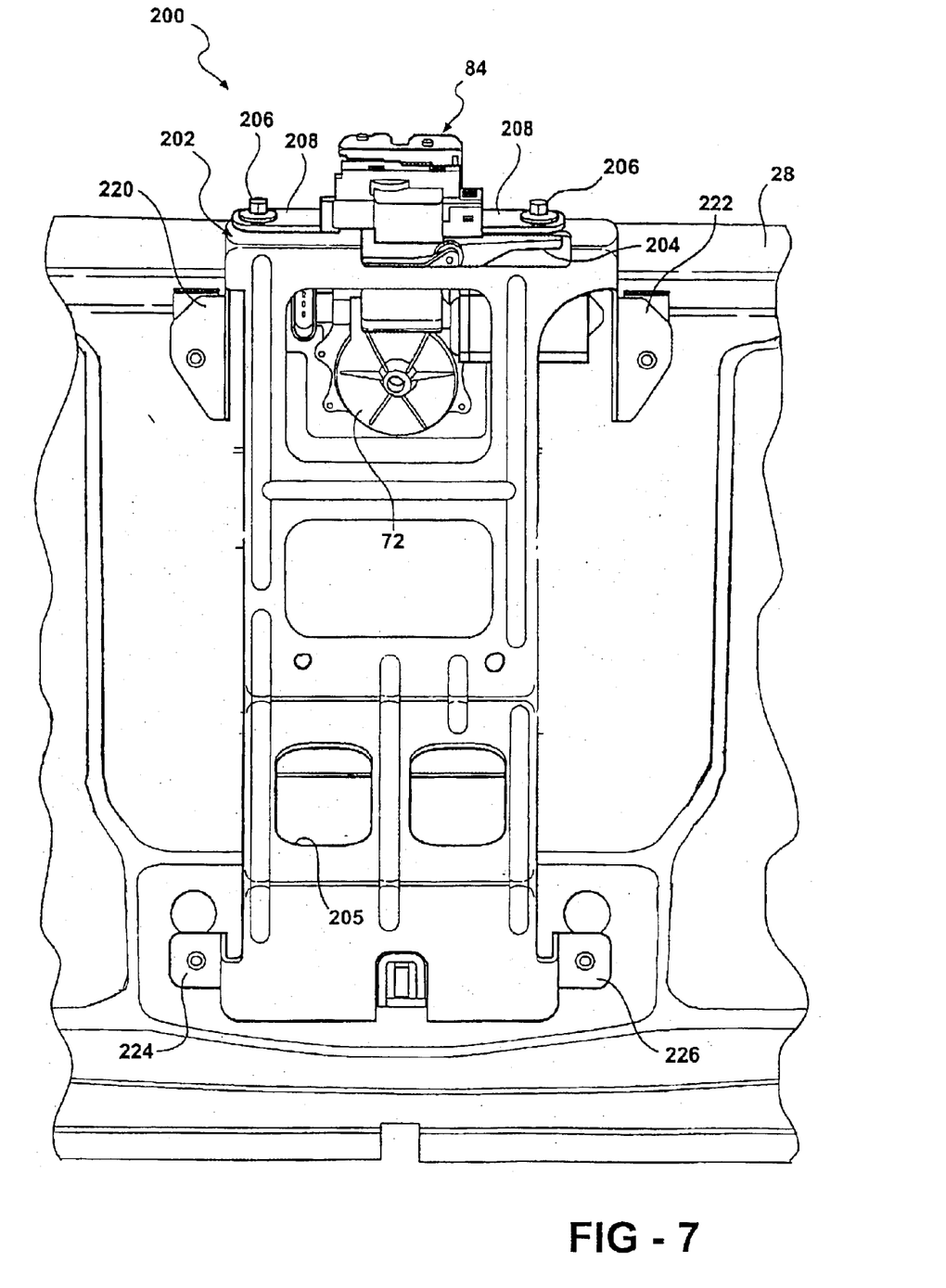
FIG. 7 is a perspective interior view of another aspect of a component module according to the present invention.

The liftgate 20 may be formed using any conventional manufacturing process, such as an outer panel 26 shown in FIG. 1, which is joined to an inner panel 28, shown in FIG. 7.

An aperture or opening 30 is formed in the liftgate 20. The aperture 30 is closed by a transparent panel 32, such as a glass window. The window 32 may be fixedly attached to the rear liftgate panel 26 or, articulated itself about an upper generally horizontally extending edge 34 to the upper edge portion of the liftgate 20 by means of one or more hinges 36 for pivotal movement of the opposed bottom end 40 between a closed position, sealed to the liftgate 20 and an open, pivotal position spaced from the adjacent portions of the outer liftgate panel 26.

As is common, a defrost grid 42 is mounted in or on the glass window 32. Opposed ends of the defrost grid 42 terminate in electrical connections or pads 44 and 46.

Any portion of the window 32 may be covered by an internally mounted plate or sheet, typically covering the defrost contact pads 44 and 46 as well as lateral or side portions to define a central transparent vision portion in the glass window 32.

Figure 2:
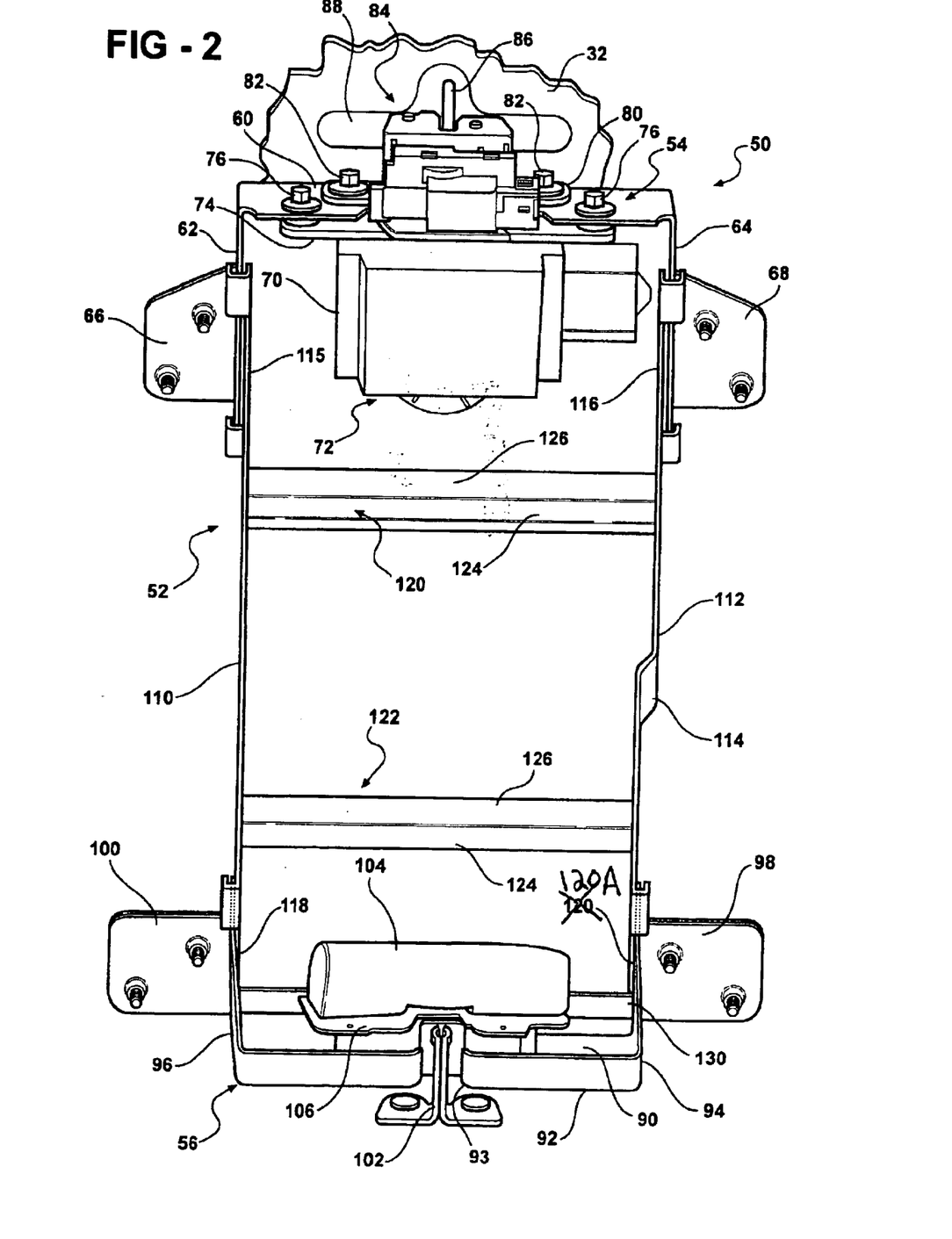
FIG. 2 is a perspective interior view of the inventive module shown mounted on the inner liftgate panel.
Figure 3:
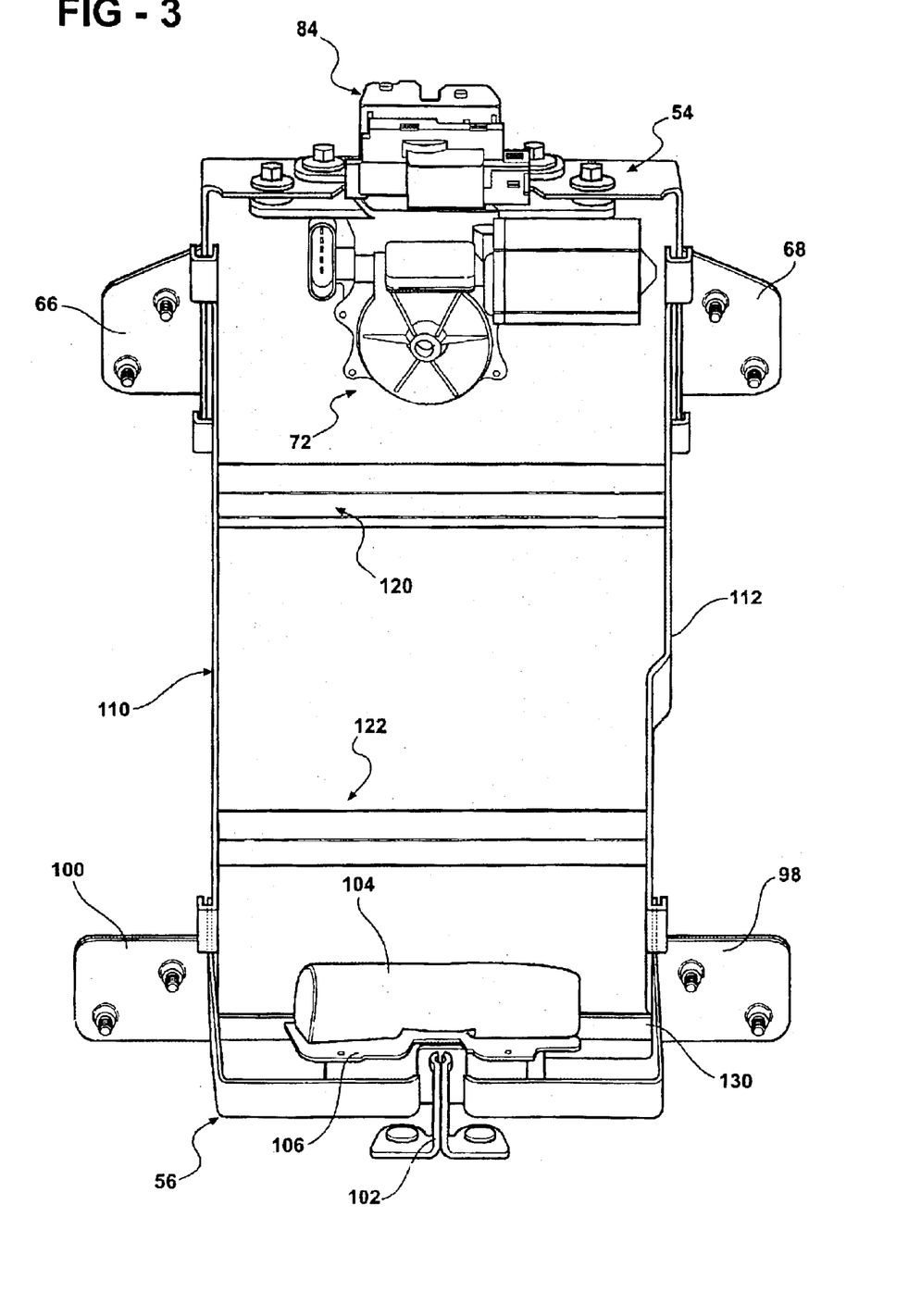
FIG. 3 is a perspective view of the module shown in FIG. 2, but with the junction box removed to show the other features of the module.
Figure 4:
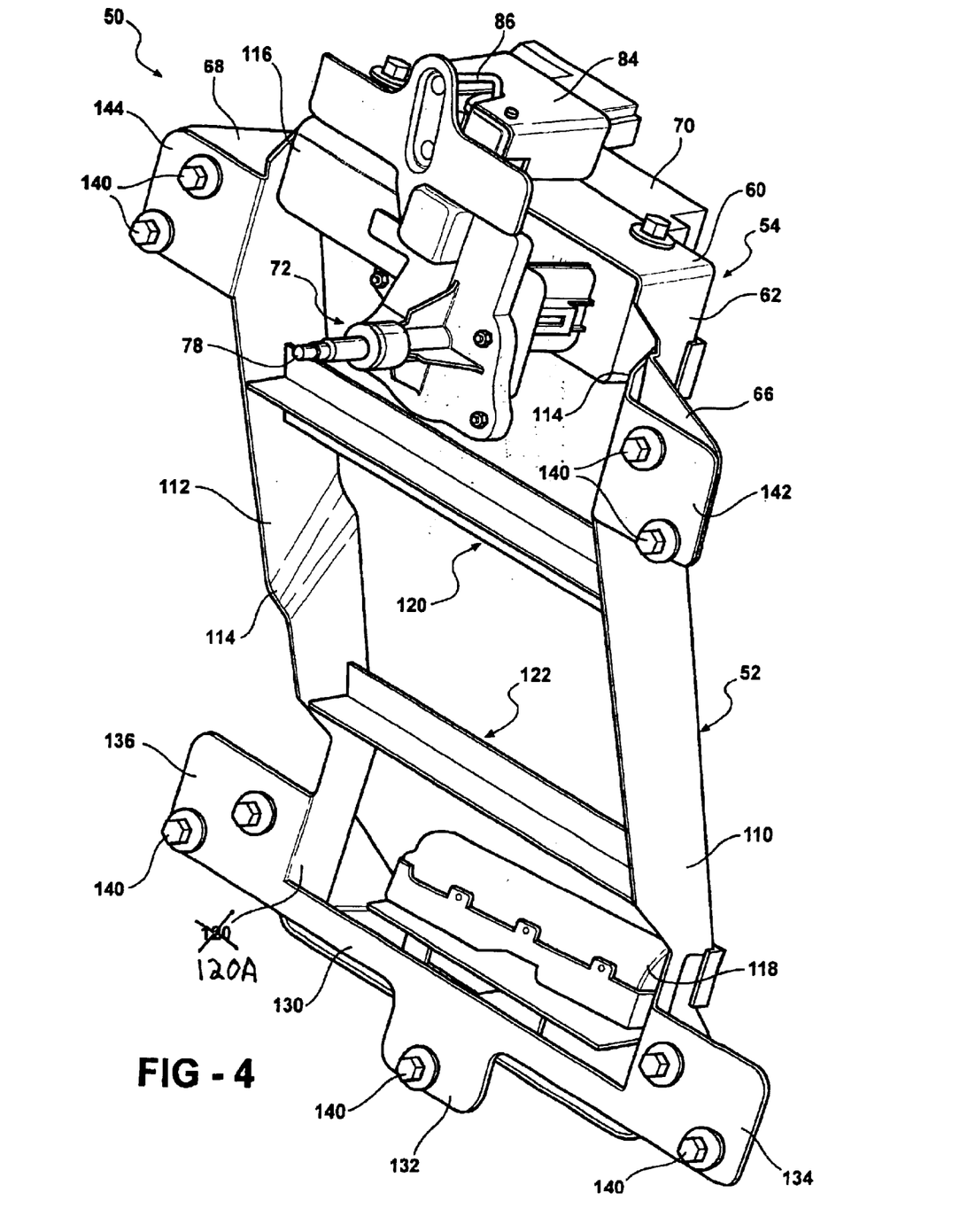
FIG. 4 is an exterior perspective view of the module shown in FIGS. 2 and 3.

Referring now to FIGS. 2–4, there is depicted one aspect of a module 50 used for unitarily mounting a plurality of vehicle accessories or components in a one-step assembly operation to the liftgate 20. The module 50 is capable of receiving any number of different vehicle accessories or components, such as a window wiper motor, flip glass latch, liftgate latch, electrical junction box, defrost grid contacts and a flip glass kick-off spring, for example.

As shown in FIGS. 2–4, the module 50 includes a frame 52 which may be formed of individual components fixedly joined together by fasteners, welds, etc., or be in the form of a unitary, one piece, formed or molded member, when the frame 52 is formed of a suitable plastic, such as PBT with 30% glass filler.

One feature of the frame 52 is flexibility. The frame 52 is provided with flexibility through its construction as well as its choice of material, whether the material be plastic or flexible metal, such as steel strips, etc.

The frame 52 unitarily interconnects a first or upper mounting bracket 54 and a second lower mounting bracket 56. Each of the brackets 54 and 56 receives individual liftgate components as described hereafter.

The first or upper mounting bracket 54 is preferably formed of a structurally strong material, such as metal, although engineered plastic materials can also be employed. The first bracket 54 includes a central base 60 and a pair of side legs 62 and 64 depending from opposite ends of the base 60. A mounting flange 66 and 68 depends angularly and laterally outward from each of the side legs 62 and 64, respectively. Each mounting flange 66 and 68 has apertures for receiving fasteners to secure the mounting flange 66 and 68 and the entire first or upper mounting bracket 54 to the frame 52 as described in detail hereafter.

A plurality of accessories or vehicle components are unitarily mounted to the first bracket 54. As shown in FIG. 2, an electrical junction box 70 is mounted on a window wash drive motor and gear transmission apparatus 72 by means of suitable fasteners or formed as part of the housing of the drive motor apparatus 72. The junction box 70 provides convenient terminals, plug-in connectors, etc., for interconnection of electrical signals and electrical power between the various components mounted on the frame 52 via the first and second mounting brackets 54 and 56 as well as to provide connections to external conductors or harnesses from the vehicle body or provides location for an electronic controller for one or more liftgate components.

The wiper drive apparatus 72 is mounted to the first mounting bracket 52 by means of a mounting plate 74 which is preferably an integral part of the housing of the drive motor 72. The mounting plate 74 may also be a separate member which is itself attached to the housing of the drive motor 72. The mounting plate 74 is attached to the first bracket 54 by means of suitable fasteners 76, such as nuts and bolts which are engagable through aligned apertures in the first bracket 54 in the mounting plate 74. In this manner, the wiper motor unit 74 is positioned so that an output drive shaft 78 of the motor unit 72 projects exteriorly of the module 50 and can be inserted through an opening in the liftgate panel 26 for receiving a wiper arm head thereon in a conventional manner.

A second mounting plate 80 is also attached to the first mounting bracket 54, again by suitable fasteners 82, such as nuts and bolts, which extend through aligned apertures in the mounting plate 80 and the first bracket 54. The mounting plate 80 is preferably formed as flange extensions of a flip glass latch assembly. The flip glass latch assembly 84 is preferably an electrically actuated device, sold by Valeo as Model No. 2-3531-824. The flip glass latch 84 pivots a claw into and out of engagement with a striker 86 carried on a striker mounting plate 88 which is affixed by means of adhesive, fasteners, etc., to the liftgate glass window 32.

Although not shown in FIGS. 2–4, electrical connectors can also be mounted on the first mounting bracket 54 for slidably receiving and forming an electrical connection with contact blades mounted on and extending inward from the inner surface of the glass window 32. The contact blades extend from contact pads attached to ends of a defrost grid mounted in or on the window 32.

The second or lower bracket 56 is formed of a suitable high strength material, such as a metal, e.g. steel, or a high-strength engineered plastic. The second bracket 56 includes a base 90 from which a central flange 92 extends from one edge. Opposed side legs 94 and 96 also project angularly from opposite ends of the base 90. Each of the side legs 94 and 96 has a angularly disposed mounting flange 98 and 100, respectively, extending therefrom.

A centrally located notch 93 is formed in the central flange 92 for allowing a striker 102 to slide therethrough. The striker 102, which does not form part of the present invention, is fixedly connected to the vehicle body at a lower edge of the rear liftgate opening. The liftgate latch apparatus 104, such as one sold by Magna International, is mounted on the base 90 by means of suitable fasteners extending through a mounting flange 106 on the latch assembly 104. The latch 104, in a manner similar to the flip glass latch 84 described above, includes a pivotal claw which is forcibly engagable with the striker 102 to latch the liftgate in a closed position sealingly closing the rear opening in the vehicle body. Release of the claw in the latch apparatus 104 enables the edge 24 of the liftgate 120 to be pivoted away from the vehicle body to an open position.

According to one aspect of the present invention, the single, unitary frame 52 interconnects the first mounting bracket 54 and the components mounted thereon, with the second mounting bracket 56 and the component(s) mounted thereon to form a single integrated, unitary assembly which can be mounted on the liftgate in a single assembly operation. In this aspect of the invention, the frame 52 is provided with flexibility so as to allow movement of the frame 52 between opposite ends to accommodate any misalignment of the mounting apertures in the liftgate panel or the mounting connections for the flip glass latch 84, or the wiper motor 72 with respect to the lower latch mounting connections 104.

By example only, the frame 52 is in the form of a lattice constructed of spaced, generally parallel side legs 110 and 112, with one or both of the side legs 110 and 112 having an offset 114 to accommodate mounting in the liftgate. The offset 114 disposes the bottom end of the side legs 110 and 112 closer together than the opposed ends of the side legs 110 and 112 adjacent to the first or upper mounting bracket 54.

The side legs 110 and 112 define generally planar, strip-like members. The upper ends 115 and 116 respectively of the side legs 110 and 112 are spaced apart by an opening which is spanned by the first mounting bracket 54. It will be understood that a cross member may be extended between the first ends 115 and 116 of the side legs 110 and 112 for added rigidity.

At least one cross member 120 and 122 is integrally connected between the side legs 110 and 112 at intermediate positions between the first ends 115 and 116 and the opposed second ends 118 and 120 of the side legs 110 and 112, respectively. The cross members 120 and 122, with two being shown by example only, provide added rigidity for the frame 52 while still allowing the frame 52 to flex between the opposed first and second ends. Again by example, the cross members 120 and 122 have a angular configuration formed of first and second angularly disposed legs 124 and 126.

As shown in FIG. 4, a bottom cross member 130 extends laterally between the second ends 118 and 120 of the side legs 110 and 112, respectively. The bottom cross member 130 includes a depending intermediately located flange 132 and opposed, laterally outward extending side flanges 134 and 136. Each of the flanges 132, 134 and 136 has one or more apertures formed therein for alignment with corresponding apertures in the mounting flanges 98 and 100 carried on the second bracket 56. Fasteners 140, which can be in the form of nuts and bolts, provide interconnection of the frame 52 to the second mounting bracket 56.

Additional mounting flanges 142 and 144 extend laterally outward from the side legs 110 and 112, respectively, adjacent the first and second ends 115 and 116 of the side legs 110 and 112. The mounting flanges 142 and 144 also carry apertures for alignment with corresponding apertures in the mounting flanges 66 and 68 on the first or upper mounting bracket 54 for receiving fasteners 140, such as nuts and bolts, to secure the upper end of the frame 52 to the upper mounting bracket 54.

Figure 5:
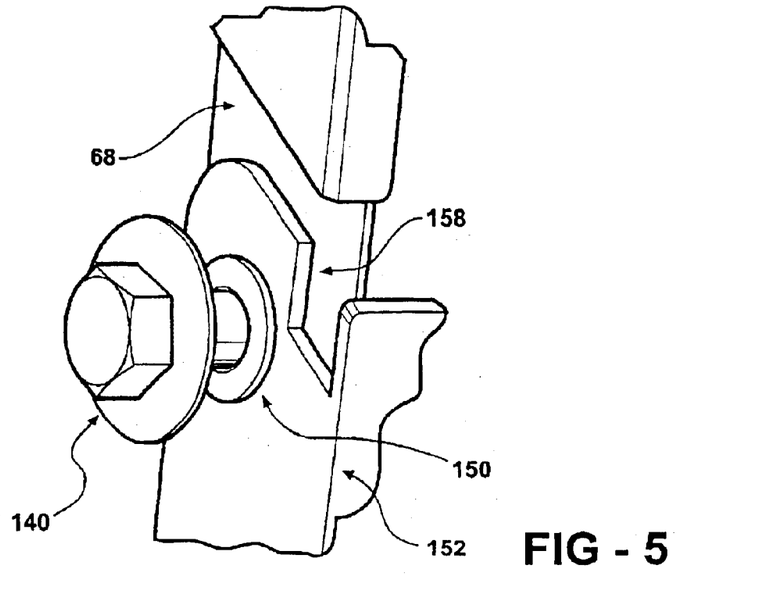
FIG. 5 is a partial, enlarged perspective view showing the connection between mounting bracket and the frame according to a first aspect of the present invention.
Figure 6:
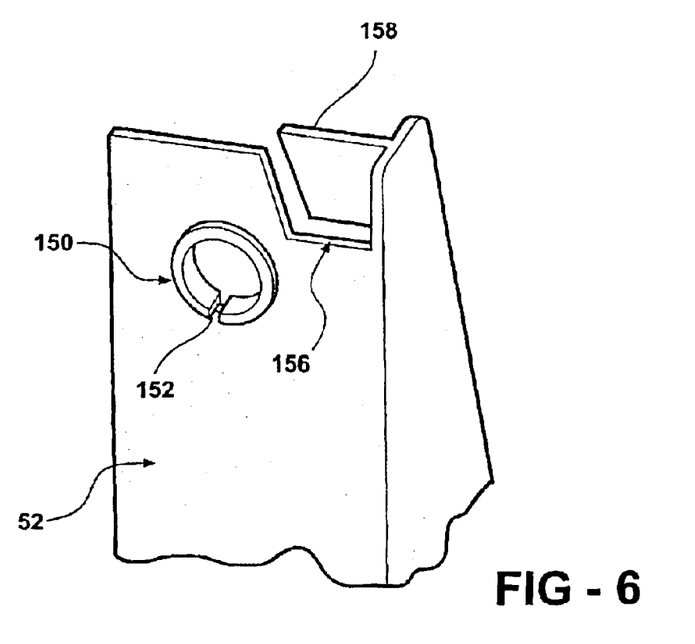
FIG. 6 is a partial, enlarged perspective view of the mounting connection shown in FIG. 5, but with the fastener removed to show the mounting slot of the present invention.

As shown in FIGS. 5 and 6, a metallic insert or washer 150, which may be in the form of a split washer, is mounted in an aperture 152 formed in the frame 52 to protect the typically plastic frame 52 from deformation or crushing during tightening of the fastener 140 to the mounting brackets 66, 68, 98 or 100 of the first and second mounting brackets 54 and 56 and to the inner liftgate sheet metal panel 28.

Since the fasteners 140 do not tightly hold the first and second mounting brackets 54 and 56 to the frame 52 until the fasteners 140 are secured to the inner liftgate panel 28, an alignment means in the form of a slot 156 is formed in the side legs 110 and 112 of the frame 52 adjacent the first ends 114 and 116 or the seconds ends 118 and 120. An offset tab 158, formed as part of the frame 52, is spaced from the slot 156 to define an open-ended channel which receives an edge portion 158 of one of the side legs of the first or second mounting brackets 54 and 56. This maintains the frame 52 on the mounting bracket 54 or 56 until the entire module 52 is secured to the liftgate inner panel 28 by tightening of the fasteners 140 to the panel 28.

In use, the module 52 is completed by attaching the components 72 and 84 to the first mounting bracket 54 and the liftgate latch 104 to the second mounting bracket 56. The individual mounting brackets 54 and 56 are then coupled to the frame 52 via the alignment slots 156. The fasteners 140 may be inserted through the aligned apertures in the mounting flanges 66, 68, 98 and 100 on the mounting brackets 54 and 56 and the corresponding mounting flanges 142, 144, 134 and 136 on the frame 52 to loosely couple the mounting brackets 54 and 56 to the frame 52. All wiring and electrical connections between the various components and external terminal or plugs for vehicle body harnesses and conductors may be made and tested, if desired, in the junction box 70.

The entire module 52 is then mounted on the liftgate inner panel 28 in the manner shown in FIG. 7, by tightening of the fasteners 140 to the panel 28. During such mounting, the drive shaft 78 of the wiper motor 72 will be inserted through an aperture in the liftgate outer panel 26.

Figure 8:
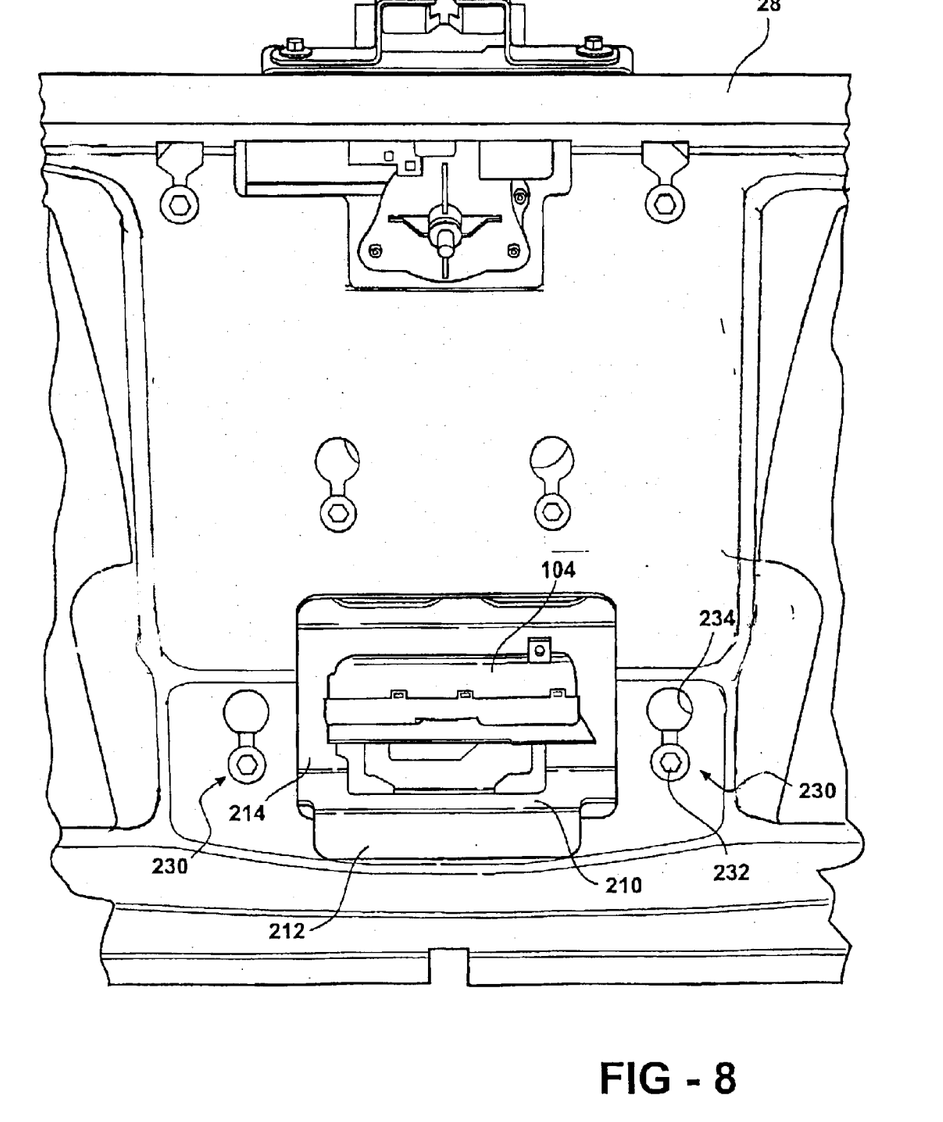
FIG. 8 is an exterior perspective view showing the module of FIG. 7 mounted on a liftgate panel.

Another aspect of a module 200 according to the present invention is shown in FIGS. 7 and 8. The module 200 is similarly designed for unitarily mounting one or more of a flip glass latch 84, a wiper drive motor unit 72 and a liftgate latch 104 to a frame 202 for unitary assembly in a single assembly operation to a liftgate inner panel 28.

In this aspect of the invention, the frame 202 is in the form of a single one-piece, plate which is formed, such as by stamping, to the desired shape described hereafter. It will be understood that the frame or plate 202 may also be formed of individual components which are fixedly secured together, such as by welding, or by the use of mechanical fasteners, into a unitary frame.

As shown in FIGS. 7 and 8, the frame 202 includes a first or upper end flange 204 which carries apertures for receiving fasteners 206, such as nuts and bolts, which are insertable through aligned apertures in the end flange 204 and mounting flanges 208 integrally formed as part of the flip glass latch 84.

Similarly, the wiper drive motor 72 has mounting arms, not shown, with apertures alignable with the apertures in the end flange 204 for securement of the drive motor 72 to the end flange 204 by the same fasteners 206.

The plate 202 includes a plurality of weight saving apertures, only one of which is identified by reference number 205 in FIG. 7. The apertures 205 provide weight reduction for the plate 202 as well as allowing an opening for passage of the latch striker and the wiper motor drive shaft therethrough.

The opposed second or lower end of the frame 202 has a second end flange 210 with a depending lip 212 insertable over an inner portion of an aperture 214 in the liftgate inner panel 28 to position the frame 202 with respect to inner panel 28. The liftgate latch 104 is secured to the end flange 210 by means of suitable fasteners.

An upper pair of mounting flanges 220 and 222 as well as a lower pair of mounting flanges 224 and 226 project laterally from the end flanges 204 and 210. Each of the flanges 220, 222, 224 and 226 have one or more apertures which receive fasteners, such as TORX-type fasteners, for securing the entire plate or frame 202 to the liftgate inner panel 28. The heads 232 of the fasteners 230 project through key hole shaped apertures 234 in the inner panel 28 and are urged to a narrow end portion of the apertures 234 wherein the fasteners 230 are tightened to secure the frame 202 to the inner panel 28.

The module 200 provides the same advantages as the module 50 described above in so far as providing a platform for mounting various liftgate accessories, such as a flip glass latch 84, a wiper drive motor 72 and the liftgate latch 104 to the liftgate 20 in a single assembly operation. In this aspect, the frame 202 is formed of a rigid, generally non-substantially rigid material, such as steel.

In conclusion, there has been disclosed a unique accessory or component module for mounting various accessories or components to a vehicle liftgate in a single assembly operation. The inventive module reduces the number of mechanical and electrical connection points, reduces weight and significantly reduces assembly time since the entire module can be mounted to the vehicle liftgate in a single operation using multiple fasteners attaching a frame portion of the module to the liftgate.

What is claimed is:

1. A unitary module for pre-mounting a plurality of vehicle liftgate accessories comprising:
    a frame having an interconnected first end and a second end, the frame having flexibility to offset the first and second ends of the frame relative to each other during mounting of the frame to a liftgate, the frame including a pair of spaced side legs and at least one cross member unitarily extending between the side legs, each side leg defining a portion of the first end and a portion of the second end of the frame;
    individual operable components directly mounted to the frame, the components including at least a window wiper drive motor, a flip glass liftgate window latch and a liftgate latch; and
    means for mounting the frame to a liftgate.

2. The module of claim 1 wherein:
    at least one of the plurality of components is mounted on the first end of the frame; and
    at least another one of the plurality of components is mounted on the second end of the frame.

3. The module of claim 1 wherein:
    the frame is formed of a flexible plastic.

4. The module of claim 3 further comprising:
    apertures carried in the frame for receiving fasteners to attach the frame to a liftgate panel; and
    metal inserts mounted in the apertures, the inserts receiving the fasteners therethrough.

5. The module of claim 3 further comprising:
    a mounting slot formed in the frame, the mounting slot adapted for receiving an end portion of at least one mounting bracket attachable to the frame.

6. The module of claim 1 further comprising:
    component attachment mounting slots formed on the frame, the slots adapted for receiving a portion of a mounting bracket carrying at least one of the plurality of components, during mounting of the mounting bracket to the frame.

7. The module of claim 1 wherein the frame further comprises:
    a plate having opposed first and second ends;
    first and second end flanges formed on the first and second ends of the plate, the first and second end flanges forming mounting platforms for the plurality of components.

8. A unitary module for pre-module a plurality of vehicle liftgate accessories comprising:
    a frame having an interconnected first end and a second end, the frame having flexibility to offset the first and second ends of the frame relative to each other during mounting of the frame to a liftgate, the frame including a pair of spaced side legs and at least one cross member unitarily extending between the side legs;
    individual operable components directly mounted to the frame, the components including at least a window wiper drive motor, a flip glass liftgate window latch and a liftgate latch;
    means for mounting the frame to the liftgate; and
    first and second mounting brackets mounted on the first and second ends of the side legs.

9. The module of claim 8 wherein the frame and the first and second mounting brackets further comprise:
    complimentary mounting flanges carried on the first and second mounting brackets and opposed ends of the frame, the complimentary mounting flanges carrying alignable apertures for receiving a fastener therethrough for securing the frame and the first and second mounting brackets together and for securing the frame and the first and second mounting brackets to a liftgate.

10. A vehicle liftgate comprising:
    a liftgate panel;
    a frame having interconnected first and second end, the frame having flexibility to offset the first and second ends of the frame relative to each other during mounting of the frame to the liftgate, the frame including a pair of spaced side legs and at least one cross member unitarily extending between the side legs, each side leg defining a portion of the first end and a portion of the second end of the frame;
    individual operable components mounted to the frame, the liftgate components including at least a plurality of a wiper drive motor, a flip glass liftgate window latch and a liftgate latch; and
    means for mounting the frame to the liftgate.

11. A method of mounting a plurality of components on a vehicle liftgate comprising the steps of:
    providing a frame having interconnected first end and second end, the frame having flexibility to offset the first and second ends of the frame relative to each other during mounting of the frame to the liftgate panel, the frame including a pair of spaced side legs and at least one cross member unitarily extending between the side legs, each side leg defining a portion of the first end and a portion of the second end of the frame;
    providing first and second mounting platforms at the first and second ends, respectively, of the frame; and
    mounting at least one of a plurality of components on one of the first and second mounting platforms on the frame.

12. A method of mounting a plurality of components on a vehicle liftgate comprising the steps of:

providing a frame having interconnected first end and second end, the frame having flexibility to offset the first and second ends of the frame relative to each other during mounting of the frame to the liftgate panel, the frame including a pair of spaced side legs and at least one cross member unitarily extending between the side legs;

providing first and second mounting platforms at the first and second ends, respectively, of the frame; and mounting at least one of a plurality of components on one of the first and second mounting platforms on the frame, the step of mounting at least one component including the step mounting a wiper drive motor on the first mounting platform.

13. A method providing a frame having interconnected first end and second end, the frame having flexibility to offset the first and second ends of the frame relative to each other during mounting of the frame to the liftgate panel, the frame including a pair of spaced side legs and at least one cross member unitarily extending between the side legs;

providing first and second mounting platforms at the first and second ends, respectively, of the frame; and mounting at least one of a plurality of components on one of the first and second mounting platforms on the frame, the step of mounting at least one component including the step of mounting a lift gate latch on the second mounting platform.

14. A method of mounting a plurality of components on a vehicle liftgate comprising the steps of:

providing a frame having interconnected first end and second end, the frame having flexibility to offset the first and second ends of the frame relative to each other during mounting of the frame to the liftgate panel the frame including a pair of spaced side legs and at least one cross member unitarily extending between the side legs;

providing first and second mounting platforms at the first and second ends, respectively, of the frame; and mounting at least one of a plurality of components on one of the first and second mounting platforms on the frame;

mounting an enclosure on the frame; and providing electrical connector means in the enclosure for electrical connection to the at least one component.

15. The method of claim 14 further wherein:

the step of mounting the at least one component further includes the step of mounting at least two components on the first and second mounting platform on the frame; and electrically interconnecting each of the plurality of components to the electrical connector means in the enclosure.

* * * * *